(12) United States Patent
Saito et al.

(10) Patent No.: US 11,894,720 B2
(45) Date of Patent: Feb. 6, 2024

(54) CORE, STATOR AND ROTATING ELECTRICAL MACHINE

(71) Applicant: SUMITOMO ELECTRIC INDUSTRIES, LTD., Osaka (JP)

(72) Inventors: Tatsuya Saito, Osaka (JP); Yuichi Nakamura, Osaka (JP); Tomoyuki Ueno, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 470 days.

(21) Appl. No.: 17/286,943

(22) PCT Filed: Dec. 11, 2019

(86) PCT No.: PCT/JP2019/048487
§ 371 (c)(1),
(2) Date: Apr. 20, 2021

(87) PCT Pub. No.: WO2020/137549
PCT Pub. Date: Jul. 2, 2020

(65) Prior Publication Data
US 2021/0384778 A1    Dec. 9, 2021

(30) Foreign Application Priority Data
Dec. 27, 2018  (JP) .................. 2018-246317

(51) Int. Cl.
*H02K 1/14* (2006.01)
*H02K 1/02* (2006.01)
*H02K 21/24* (2006.01)

(52) U.S. Cl.
CPC ............... *H02K 1/146* (2013.01); *H02K 1/02* (2013.01); *H02K 21/24* (2013.01)

(58) Field of Classification Search
CPC .......... H02K 1/146; H02K 1/02; H02K 21/24; H02K 1/182; H02K 1/2793; H02K 1/2796; H02K 1/2798; H02K 21/026; H02K 37/08; H02K 37/125
USPC .................................... 310/156.32
See application file for complete search history.

(56) References Cited

U.S. PATENT DOCUMENTS

| | | | |
|---|---|---|---|
| 11,770,034 B2 * | 9/2023 | Saito ............... | H02K 21/24 |
| | | | 310/156.32 |
| 2008/0226474 A1 | 9/2008 | Yoshida et al. | |
| 2010/0225195 A1 | 9/2010 | Asano et al. | |
| 2021/0351639 A1 * | 11/2021 | Saito ............... | H02K 3/522 |

(Continued)

FOREIGN PATENT DOCUMENTS

| | | |
|---|---|---|
| JP | 2003-079120 | 3/2003 |
| JP | 2009-044829 | 2/2009 |

(Continued)

*Primary Examiner* — Ahmed Elnakib
(74) *Attorney, Agent, or Firm* — IPUSA, PLLC (57) ABSTRACT

A core used in an axial gap type rotating electrical machine includes an annular yoke having a plurality of through-holes disposed in a circumferential direction, and a plurality of columnar teeth disposed in the circumferential direction of the yoke, each of the plurality of columnar teeth including one end inserted into each of the plurality of through-holes. The yoke and each of the teeth are composed of a powder compact separate from each other, and the one end of each of the teeth is off-center in the through-hole.

13 Claims, 5 Drawing Sheets

(56) References Cited

U.S. PATENT DOCUMENTS

2021/0384778 A1\* 12/2021 Saito .................. H02K 1/146
2022/0329115 A1\* 10/2022 Saito .................. H02K 1/02

FOREIGN PATENT DOCUMENTS

| JP | 2009-060754 | | 3/2009 |
| JP | 2009060754 | \* | 3/2009 |
| WO | 2007/072561 | | 6/2007 |
| WO | 2007/114079 | | 10/2007 |

\* cited by examiner

CORE, STATOR AND ROTATING ELECTRICAL MACHINE

TECHNICAL FIELD

The present disclosure relates to a core, a stator and a rotating electrical machine.

This application claims priority to Japanese Application No. 2018-246317, filed on Dec. 27, 2018, the entire contents of which are incorporated by reference therein.

BACKGROUND ART

Patent Document 1 discloses an axial gap type rotating electrical machine in which a rotor and a stator are disposed opposite to each other in the axial direction of the rotor as one of the rotating electrical machines. The stator used in this type of rotating electrical machine includes a yoke and a core having a plurality of teeth, and a coil disposed in each of the teeth. Typically, the yoke is an annular plate-like member. Each of the teeth is a columnar member projecting axially in the yoke and arranged spaced apart in the circumferential direction of the yoke. Patent Document 1 further discloses that the yoke and the teeth are configured in a separable manner.

PRIOR ART DOCUMENTS

Patent Documents

Patent Document 1: Japanese Patent Application Laid-Open No. 2009-044829

SUMMARY OF THE INVENTION

A core of the present disclosure is a core used in an axial gap type rotating electrical machine, including:

an annular yoke having a plurality of through-holes disposed in a circumferential direction; and a plurality of columnar teeth disposed in the circumferential direction of the yoke, each of the plurality of columnar teeth including one end inserted into each of the plurality of through-holes, wherein the yoke and each of the teeth are composed of a powder compact separate from each other, and wherein the one end of each of the teeth is off-center in the through-hole.

A stator of the present disclosure includes:
the core as the present disclosure; and
a coil disposed in each of the teeth.

A rotating electrical machine of the present disclosure includes:
the stator of the present disclosure.

MODE OF CARRYING OUT THE INVENTION

Problems to Be Solved by the Disclosure

As a core used in an axial gap type rotating electrical machine, it is desirable to be able to construct a rotating electrical machine whose stator can be easily assembled and that can obtain a high torque.

Accordingly, the present disclosure is intended to provide a core capable of constructing a rotating electrical machine with high torque and enhanced stator manufacturability.

Another object of the present disclosure is to provide a stator capable of constructing a rotating electrical machine having high torque and excellent in manufacturability.

Moreover, another object of the present disclosure is to provide a rotating electrical machine having high torque and enhanced manufacturability.

Effect of the Disclosure

A core of the present disclosure can construct a rotating electrical machine with high torque and is also excellent in stator manufacturability.

A stator of the present disclosure can construct a rotating electrical machine with high torque and is also excellent in manufacturability.

A rotating electrical machine of the present disclosure has a high torque and an excellent manufacturability.

DESCRIPTION OF EMBODIMENTS OF THE PRESENT DISCLOSURE

To begin with, embodiments of the present disclosure are listed and described.

(1) A core according to one embodiment of the present disclosure is a core used in an axial gap type rotating electrical machine, including:

an annular yoke having a plurality of through-holes disposed in a circumferential direction; and a plurality of columnar teeth disposed in the circumferential direction of the yoke, each of the plurality of columnar teeth including one end inserted into each of the plurality of through-holes, wherein the yoke and each of the teeth are composed of a powder compact separate from each other, and wherein the one end of each of the teeth is off-center in the through-hole.

The core of the present disclosure is composed of a powder compact including a yoke and teeth separate from each other. Therefore, the core of the present disclosure is excellent in stator manufacturability. The teeth before being fixed to the yoke are columnar and simple in shape. In contrast, the powder compact, in which yoke and teeth are integrated, is complex in shape. Accordingly, placing the coil on the teeth before fixing the teeth to the yoke is easier to place the coil than placing the coil on the teeth in the powder compact, where the yoke and teeth are integrated. Also, forming a powder compact in a simple form of yoke and teeth are easier to form a powder compact than forming a powder compact in a complex shape.

The core of the present disclosure is disposed unevenly in through-holes in which one ends of the teeth are formed in the yoke with respect to the fixation of the teeth to the yoke. Accordingly, the core of the present disclosure can inhibit a decrease in torque and can construct an axial gap type rotating electrical machine having a high torque. Disposed unevenly in the through-hole means that there is a region where the distance between the outer peripheral face of one end of the tooth and the inner peripheral face of the through-hole is locally small. Quantitatively, disposed unevenly in the through-hole means having a region that satisfies 50% or less of the average distance between the outer peripheral face of one end of the tooth and the inner peripheral face of the through-hole. Disposed unevenly in the through-hole qualitatively means that the center of gravity of the tooth does not coincide with the center of gravity of the through-hole when the outer shape of the teeth and the shape of the through-hole are similar. The sheath is positioned unevenly in the through-hole, thereby creating a small distance region that is a magnetic gap between the tooth and the yoke. Therefore, the magnetic flux between the tooth and the yoke passes through the small gap.

(2) As an example of the core of the present disclosure, wherein each of the teeth includes a proximal region with a gap of 0.05 mm or less between an outer peripheral face at one end and an inner peripheral face of the through-hole.

In the above configuration, the distance between the proximal region of the tooth and the inner circumferential face of the through-hole is very small. Therefore, in the above-described embodiment, the proximal region of the tooth is considered to be the region substantially in contact with the inner peripheral face of the through-hole. Therefore, the gap between the proximal region of the tooth and the yoke is unlikely to become a magnetic gap. Therefore, in the above-described configuration, the passage of the magnetic flux between the tooth and the yoke can be better secured through the proximal region of the tooth. Accordingly, the above-described embodiment is more likely to inhibit a decrease in torque and can construct an axial gap type rotating electrical machine having a high torque.

(3) As an example of the core in (2) above,
wherein a percentage of a length along the circumferential direction of the through-hole in the proximity region is 20% or more with respect to a circumferential length of the through-hole.

The above configuration allows for a better passage of magnetic flux between the tooth and the yoke through the proximal region of the tooth due to the long proximal region of the tooth. Accordingly, the above-described configuration is further likely to inhibit the decrease in torque, and can construct an axial gap type rotating electrical machine having a higher torque.

(4) As an example of the core in (2) or (3) above, wherein a difference between a maximum value and a minimum value of the distance between the outer peripheral face of the one end and the inner peripheral face of the through-hole is less than 0.40 mm.

It can be said that the above configuration does not have a region where the gap is locally large, that is, a large magnetic gap. For this reason, the above-described configuration can easily secure a passage of magnetic flux between the teeth and the yoke. Accordingly, the above-described configuration is likely to inhibit a decrease in torque, and can construct an axial gap type rotating electrical machine having a high torque.

(5) As an example of any one of the cores in (2) to (4) above,
wherein each of the teeth comprises at least a portion of the proximal region on an outer peripheral face side of the yoke.

Typically, the outer shape of the teeth is a trapezoidal shape. The length of the region located on the outer periphery of the yoke (hereinafter referred to as the "outer peripheral region") in teeth of such a shape is longer than the length of the region located on the inner periphery (hereinafter referred to as the "inner peripheral region"). Accordingly, when a proximal region is included in the outer peripheral region of the tooth, a long proximal region is easily secured. Because of the long proximal region, the above-described configuration is likely to ensure a preferable passage of magnetic flux between the tooth and the yoke through the proximal region of the tooth. Accordingly, the above-described configuration is likely to further inhibit the decrease in torque, and can construct an axial gap type rotating electrical machine having a higher torque.

(6) As an example of any one of the cores in (2) to (5) above,
wherein the teeth adjacent in the circumferential direction comprises at least a portion of the proximal regions on facing sides of the adjacent teeth.

In the above configuration, proximal regions of adjacent teeth are positioned facing each other. Accordingly, adjacent teeth can easily secure the passage of magnetic flux through the proximal region of each tooth.

Accordingly, the above-described configuration easily inhibits a decrease in torque, and can construct an axial gap type rotating electrical machine having a high torque. When the above-described configuration is used in a multi-phase AC rotating electrical machine, both coils of the same phase and coils of the different phase can be disposed in each of the teeth.

(7) As an example of the core in (6) above,
wherein the adjacent teeth include in-phase coils.
The above-described form is more likely to inhibit the decrease in torque as compared to the case where a different coil is disposed.

(8) As an example of any one of the cores in (2) to (5) above,
wherein the teeth comprise at least a portion of the proximal region on the same circumferential side of the yoke.

In the above-described embodiment, the passage of magnetic flux is easily secured through the proximal region of each tooth. Accordingly, the above-described configuration easily inhibits a decrease in torque, and can construct an axial gap type rotating electrical machine having a high torque. In addition, because the above-described form allows for uniform fixation of each tooth to the yoke, and the core is improved in workability.

(9) As an example of the core of the present disclosure,
wherein each of the teeth comprises one end plane located in the through-hole and another end plane located outside the through-hole,
wherein the yoke comprises a first face disposed on a side protruding from the teeth and a second face opposite the first face,
wherein when a plane extended from the second face is defined as a reference plane, and when a length from the reference place to the other end face is defined as a height of the teeth, the plurality of teeth has a variation of 0.1 mm or less in height.

In the above configuration, the height variation of multiple teeth is very small. Therefore, in the above-described embodiment, the height of the plurality of teeth is considered to be substantially uniform and the other end faces of the plurality of teeth are substantially on the same plane. When such a core is used to construct a rotating electrical machine, the magnetic flux of the magnet received by the teeth is substantially uniform at any point because the other end face of the teeth faces the magnet at substantially uniform intervals, and the cogging torque is easily reduced. In the core of the present disclosure, one end of the tooth is inserted into the through-hole of the yoke. Therefore, by adjusting the insertion amount of one end of the tooth to the through-hole, it is possible to easily adjust the height of each tooth.

(10) As an example of the core in (9) above,
wherein a length from the reference plane to the one end plane is not more than 10% of the thickness of the yoke.

Typically, the yoke thickness is substantially uniform across all teeth, and the axial length of the teeth is substantially uniform across all the teeth. Therefore, the height of each tooth can be fixed in the above-described manner. In the above-described form, because the area facing the outer peripheral face of one end of the tooth and the inner peripheral face of the through-hole is sufficiently secured, the area of the magnetic flux passing between the tooth and the yoke can be sufficiently secured. In addition, in the above-described configuration, because the area facing the outer peripheral face of one end of the tooth and the inner peripheral face of the through-hole can be sufficiently secured, the fixation of the yoke and the tooth can be strengthened.

(11) As an example of the core of the present disclosure,
wherein the core component material comprises pure iron, an iron base alloy containing Si, or an iron base alloy containing Al.

In the above-described form, when the core contains pure iron, there is an effect such that the core is easily formed into a core with a high saturation magnetic flux density, the core is easily formed into a dense core, the core is easily formed into a core, and the manufacturing performance of the core is improved. If the above form includes an iron base alloy, it can be a low-loss core.

(12) As an example of the core of the present disclosure,
wherein a relative density of the core is 90% or more.

The above-described form has a high relative density of 90% or more, which is high and dense. Such a form can be used to construct an axial gap type rotating machine with excellent magnetic characteristics such as high saturation flux density.

(13) A stator according to one embodiment of the present disclosure,
the core of any one of the above (1) to (12); and a coil disposed in each of the teeth.

The stator of the present disclosure has a core of the present disclosure, which facilitates the mounting of coils and provides excellent manufacturability. Because the stator of the present disclosure also has a core of the present disclosure, a reduction in torque can be inhibited, and an axial gap type rotating electrical machine having a high torque can be constructed.

(14) A rotating electrical machine according to one embodiment of the disclosure,
the stator of the present disclosure, and
a rotor disposed facing the stator.

The rotating electrical machine of the present disclosure includes a stator of the present disclosure, which makes it easier to assemble the stator and has improved manufacturability. Because the rotating electrical machine of the present disclosure includes a stator of the present disclosure, it is possible to inhibit a decrease in torque and to have a high torque.

DETAILS OF EMBODIMENTS OF THE PRESENT DISCLOSURE

Details of embodiments of the present disclosure will now be described with reference to the drawings. The same symbol in the figure indicates the same name. It should be understood that the disclosure is not limited to these examples, but is intended to include all modifications within the meaning and scope of the claims and equivalents.

<Core>

Referring to FIGS. 1 to 5 and FIGS. 6 and 7 as appropriate, a core 1 of the embodiment will be described. The core 1 includes an annular yoke 3 and a plurality of columnar teeth 2. The core 1 is used in an axial gap type rotating electrical machine (for example, a rotating electrical machine 9 illustrated in FIG. 7, which will be described later). Typically, the core 1 can be used for the core of a stator (for example, a stator 8 illustrated in FIG. 6, below). The core 1 is used as a component of a magnetic circuit in which magnetic flux produced by a coil 80 and magnetic flux of a magnet 95 (FIG. 7) pass through the coil 80 (FIG. 6, FIG. 7) are arranged in each of teeth 2.

The core 1 of the embodiment is formed of a powder compact in which the yoke 3 and each tooth 2 are separate from each other. The core 1 of the embodiment includes a through-hole 30 through which one end of each tooth 2 is inserted into the yoke 3. One feature of the core 1 is that one end of each tooth 2 is disposed unevenly within the through-hole 30. A detailed illustration is as follows.

<Yoke>

The yoke 3 is a plate member having an annular plane shape. The yoke 3 magnetically couples adjacent teeth 2 to each other in the circumferential array of yoke 3. The yoke 3 has an axial hole 39 in its center that penetrates the front and back faces (first and second faces 31 and 32). A first face 31 is a face located on a side where the teeth 2 protrudes from the yoke, and a second face 32 is an opposite face of the first face 31.

The yoke 3 includes a through-hole 30 through which one end of the teeth 2 is inserted. The through-hole 30 penetrates the front and back faces (the first face 31 and the second face 32) of the yoke 3. The through-holes 30 are suitably provided according to the number of teeth 2. Because a plurality of teeth 2 is provided, a plurality of through-holes 30 is also provided. The through-holes 30 are provided in a predetermined distance in the circumferential direction of the yoke 3. Typically, the hole shape and size of each of the through-holes 30 are the same. The hole shape of the through-hole 30 is typically similar to the outer shape of the tooth 2 described below in a cross-sectional shape cut in a plane parallel to the first face 31. The size of the through-hole 30 can be appropriately selected to allow for insertion of one end of the tooth 2.

The yoke 3 is formed of a member separate from the teeth 2. The yoke 3 and the teeth 2 are secured by inserting one ends of the teeth 2 into the through-holes 30. For example, the yoke 3 and the teeth 2 are bonded with adhesive while one ends of the teeth 2 are inserted into the through-holes 30. In this case, an adhesive is interposed between the inner peripheral faces of the through-holes 30 and the outer peripheral faces of one ends of the teeth 2. The relationship between the through-holes 30 of the yoke 3 and one ends of the teeth 2 will be described in more detail below.

The size (outer diameter, inner diameter, thickness, and the like) of the yoke 3 can be appropriately selected according to the specification of the rotating electrical machine 9. For example, the inner diameter of the yoke 3 (the diameter of the axial hole 39) may be 5 mm or more and 150 mm or less; the outer diameter of the yoke 3 may be 30 mm or more and 300 mm or less; the thickness of the yoke 3 may be 1.0 mm or more and 10 mm or less, and the thickness of the yoke 3 may be 1.5 mm or more and 7.0 mm or less.

<Teeth>

Figure 1:
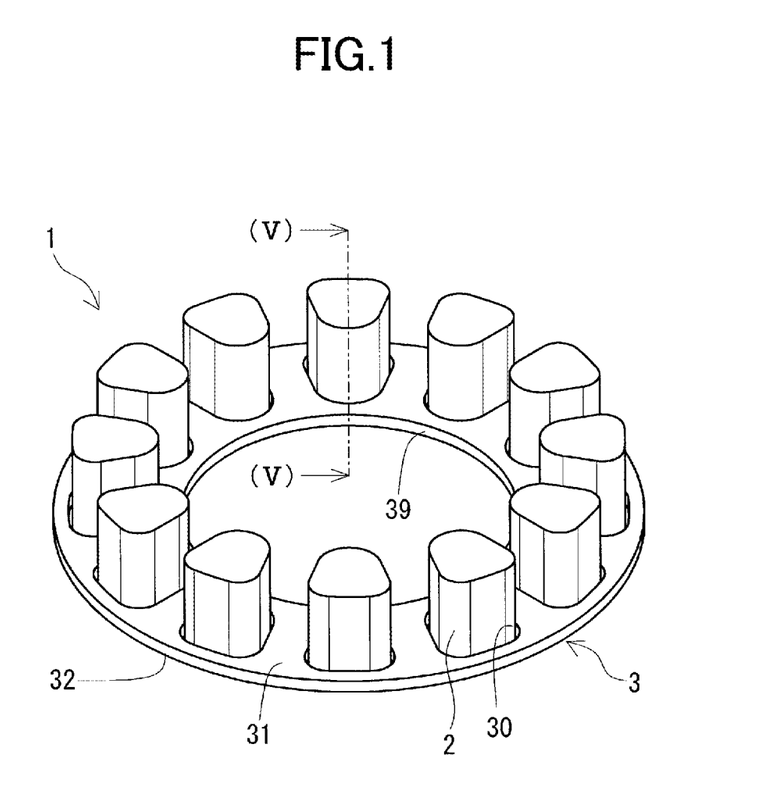
FIG. 1 is a schematic perspective view illustrating an example of a core of an embodiment.

Each tooth 2 is a column-like member projecting orthogonally to the first face 31 of the yoke 3. Each tooth 2 is arranged in a predetermined distance in the circumferential direction of the yoke 3. Typically, as illustrated in FIG. 1, each tooth 2 is equally spaced in the circumferential direction of the yoke 3. The direction perpendicular to the first face 31 of the yoke 3 corresponds to the direction parallel to the axial direction of the axial hole 39 of the yoke 3. The axial direction of each tooth 2 corresponds to the direction parallel to the axial direction of the yoke 3.

Typically, each tooth 2 has the same shape and size. The outer shape of the teeth 2 is typically a prism and the like in which a cross-sectional shape cut in a plane perpendicular to the axial direction of the teeth 2 is uniformly shaped in the axial direction of the teeth 2. The teeth 2 in this example are square pillars having trapezoidal cross-sectional shapes. The teeth 2 of this example also have a uniform cross-sectional shape over the entire axial length of the teeth 2. As to the teeth 2 having the trapezoidal cross-sectional shapes described above, it is easy to secure a large cross-sectional area. Further, the dead space of the core 1 is easily reduced, and it is easy to construct a stator 8 having a high occupancy rate. Another contour example includes a rectangular prism in which the cross-sectional shape is triangular, such as an isosceles triangle. Examples of other contours include a rectangular body having a rectangular cross-sectional shape and a cylindrical body having a circular cross-sectional shape.

Here, the "trapezoidal shape" and the "triangular shape" include not only the geometrical trapezoidal shape and triangular shape, but also a scope substantially regarded as a trapezoidal shape and a triangular shape, while including a shape having rounded corners, as in the present example. For example, when the contour of the cross section includes a straight line, the intersection of the extended line of the straight line includes a shape that forms a polygonal vertex. Alternatively, for example, when the contour of the cross section includes a curve and a line, the contour includes a shape in which the intersection of the tangent of the curve with the line of an extension of the line forms a polygonal vertex.

The number of teeth 2 should be two or more, and the selection can be made appropriately. For example, the number may be three or more, and further six or more. When the core 1 is used in a three-phase AC rotating electrical machine, the number of teeth 2 is preferably a multiple number of three. FIG. 1 illustrates a form in which the above-described number is twelve.

The size of the teeth 2 (the cross-sectional area, the length in the axial direction, and the like) can be appropriately selected according to the specification of the rotating electrical machine 9. For example, the cross-sectional area of each tooth 2 is not less than 5 mm$^2$ and not more than 800 mm$^2$, and the axial length of each tooth 2 is not less than 3 mm and not more than 40 mm. Here, the cross-sectional area of the tooth 2 means the area of the cross-section cut in the plane perpendicular to the axial direction of the tooth 2.

<Relationship Between Yoke and Teeth>

Hereinafter, the relationship between the through hole 30 of the yoke 3 and one end portion of the tooth 2 will be described in detail with reference to FIGS. 2 to 5.

The size of the through-hole 30 of the yoke 3 is typically designed to be larger than the size of one end of the tooth 2, while considering the margin, so as to facilitate insertion of the tooth 2. As a result, there is a gap between the outer peripheral face 20 of one end of the tooth 2 and the inner peripheral face 300 of the through-hole 30. This gap results in a magnetic gap and causes a decrease in torque. In contrast, it has been found that if at least a portion of the through-hole 30 in the circumferential direction has a very small gap, it is possible to prevent the torque from decreasing. Probably, this is because the magnetic flux passes between the tooth 2 and the yoke 3 through a very small gap.

Figure 2:
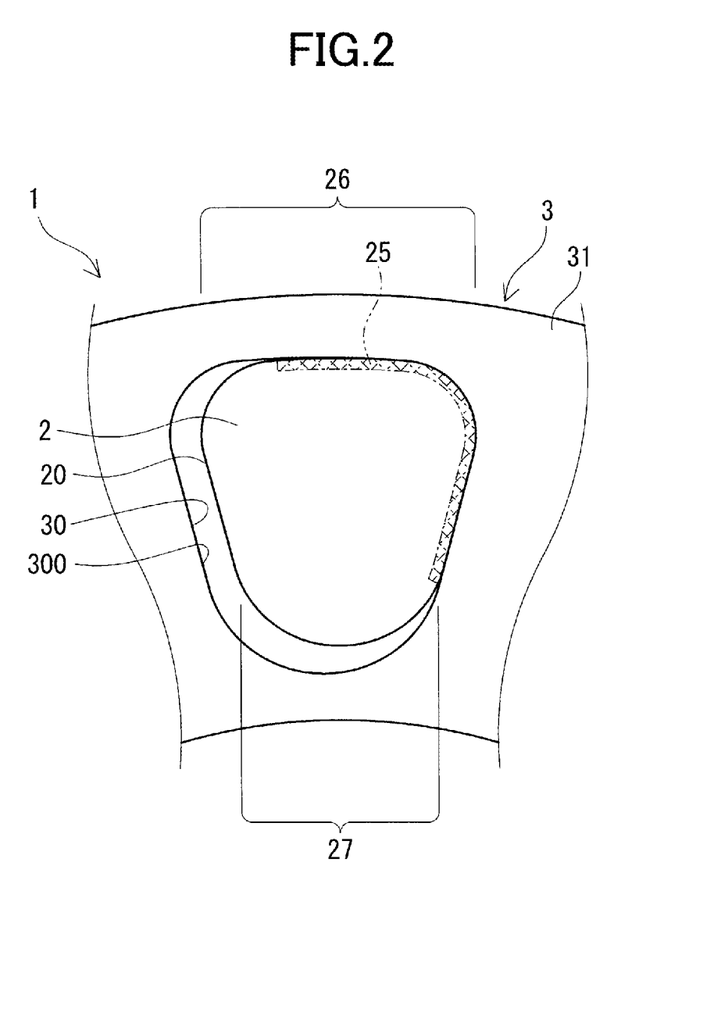
FIG. 2 is a diagram illustrating a distance between an outer peripheral face of one end of a tooth and an inner peripheral face of a through hole of a yoke in a core of the embodiment.

Therefore, one end of the tooth 2 is disposed unevenly in the through-hole 30. Disposed unevenly within the through hole 30 is that the distance between the outer peripheral face 20 of one end of the tooth 2 and the inner peripheral face 300 of the through hole 30 is locally small. Quantitatively, disposed unevenly within the through-hole 30 means having a region that satisfies 50% or less of the average value of the distance between the outer peripheral face 20 of one end of the tooth 2 and the inner peripheral face 300 of the through-hole 30. The average value of the distance between the outer peripheral face 20 of one end portion of the tooth 2 and the inner peripheral face 300 of the through-hole 30 is determined, for example, by the average of the values measured at equal intervals of at least 10 points in the circumferential direction of the through-hole 30. Also, when the outer shape of the tooth 2 and the hole shape of the through-hole 30 are similar, the unevenly disposed inside the through-hole 30 means that the center of gravity of the tooth 2 and the center of gravity of the through-hole 30 do not coincide. FIG. 2 illustrates a configuration in which the outer shape of the tooth 2 and the hole shape of the through-hole 30 are similar and the center of gravity of the tooth 2 does not coincide with the center of gravity of the through-hole 30.

The tooth 2 includes a proximal region 25 in which the distance between the outer peripheral face 20 of one end portion and the inner peripheral face 300 of the through-hole 30 is 0.05 mm or less. FIGS. 2 to 5 illustrate a proximal region 25 hypothetically, with a double-dotted crosshatch applied to a portion of the region near the outer peripheral face 20 at one end of the tooth 2. In each of the figures, the above-described distance is illustrated while being enlarged to be understandable.

<<Spacing Between Proximal Region and Yoke>>

The distances between the proximal regions 25 of the teeth 2 and the inner peripheral faces 300 of the through-holes 30 of the yoke 3 are as small as 0.05 mm or less. The proximal regions 25 of the teeth 2 are regions substantially in contact with the inner peripheral faces 300 of the through-holes 30. Therefore, it is difficult to obtain magnetic gaps between the proximal regions 25 of the teeth 2 and the yoke 3. By constructing the rotating electrical machine 9 (FIG. 7) using the core 1, the passage of magnetic flux between the teeth 2 and the yoke 3 can be better secured through the proximal region 25 of the teeth 2. Therefore, the rotating electrical machine 9 is more likely to inhibit the decrease in torque and to have a high torque.

The smaller the between the proximal regions 25 of the teeth 2 and the inner peripheral faces 300 of the through-holes 30 of the yoke 3, the better the passages of magnetic flux between the teeth 2 and the yoke 3 is secured through the proximal regions 25. When further inhibition of the decrease in torque is desired, the above-described distance is preferably 0.04 mm or less, further 0.03 mm or less, and 0.02 mm or less. The core 1 may have regions with substantially 0 mm spacing.

<<Junction Ratio>>

The longer the proximal region 25 of the teeth 2, the more preferable the performance. Quantitatively, it is preferable that the ratio of the length L25 along the circumferential direction of the through hole 30 in the proximal region 25 (hereinafter, referred to as the "bonding percentage") be 20% or more with respect to the circumferential length L30 of the through hole 30. The above bonding percentages is given by (L25/L30)×100.

If the above-described bonding percentage is 20% or more, it can be said that the proximal region 25 of the tooth 2 is long. Therefore, the passage of magnetic flux between the tooth 2 and the yoke 3 is better secured through the proximal region 25. When further inhibition in torque reduction is desired, the above-described bonding percentage is preferably 25% or more, 30% or more, and 35% or more.

The greater the bonding percentage described above, the more preferable it is in the range of less than 100%. In contrast, if the above-described bonding percentage is 70% or less, for example, the margin for inserting the tooth 2 into the through-hole 30 can be largely secured, and the assembly workability between the teeth 2 and the yoke 3 is improved. If it is desired to improve assembly workability, the bonding percentage may be 65% or less, further may be 60%.

<<Maximum Difference Between Distance>>

By disposing one end of the tooth 2 unevenly in the through-hole 30, a region may occur having a relatively large gap between the outer peripheral face 20 of one end of the tooth 2 and the inner peripheral face 300 of the through-hole 30. Even in this case, the difference between the maximum value and the minimum value of the distance (hereinafter, this difference is referred to as the maximum difference of the distance) is preferably less than 0.40 mm. If the maximum difference in the distance is less than 0.40 mm, it can be said that the core 1 does not have a locally large region where the distance between the outer peripheral face 20 of one end of the tooth 2 and the inner peripheral face 300 of the through hole 30 is large. Locally large regions of the above distance result in large magnetic gaps. Therefore, if the maximum difference in the distance is less than 0.40 mm, the core 1 does not have a large magnetic gap, and it is easy to ensure the passage of magnetic flux between the teeth 2 and the yoke 3. Therefore, the reduction of torque is easily inhibited. The smaller the maximum difference in the distance, the less reliably the core 1 has a large magnetic gap, and the easier it is to ensure the passage of magnetic flux between the teeth 2 and the yoke 3. When further inhibition of the decrease in torque is desired, the maximum difference in the distance is preferably 0.35 mm or less, and further 0.30 mm or less.

<<Position of Proximal Region>>

The tooth 2 includes a proximal region 25 at any circumferential location of the through-hole 30 of the yoke 3. As illustrated in FIG. 2, the tooth 2 may include at least a portion of the proximal region 25 on the outer periphery of the yoke 3 in the tooth 2. In this case, the proximal region 25 is easily lengthened. For example, if the outline of the tooth 2 is a trapezoidal shape and the long side portion of the trapezoidal shape is located on the outer peripheral side of the yoke 3, the length of an outer peripheral region 26 located on the outer peripheral side of the yoke 3 in the teeth 2 is longer than the length of an inner peripheral region 27 located on the inner peripheral side of the yoke 3 in the tooth 2.

Therefore, if at least a portion of the proximal region 25 is provided in the outer peripheral region 26 of the tooth 2, the proximal region 25 can be easily secured for a long time. The longer the proximity region 25, the greater the bonding percentage described above. As a result, the core 1 easily secures the passage of magnetic flux between the tooth 2 and the yoke 3 through the proximal region 25, and more easily inhibits the decrease in torque.

FIG. 2 illustrates an example of an L-shaped proximal region 25 over an outer peripheral region 26 of the tooth 2 and a circumferential region of a yoke 3 in a tooth 2. Alternatively, the core 1 may include a proximal region 25 only in the outer peripheral region 26 of the tooth 2. Alternatively, the core 1 may include only the inner periphery region 27 of the tooth 2 or only one circumferential region 25 of the yoke 3 in the tooth 2.

The tooth 2 includes at least a portion of the proximal region 25 in the outer peripheral region 26 of the tooth 2, and preferably has a bonding percentage of 20% or more as described above.

Figure 3:
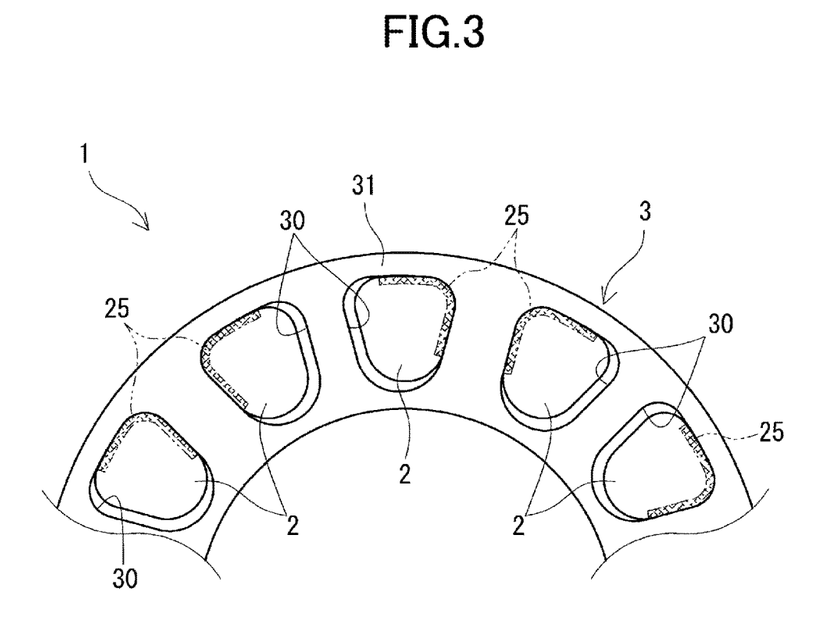
FIG. 3 is a schematic plan view showing a portion of a core of an embodiment regarding an example of a core whose teeth include proximate regions opposite to each other.

Also, as illustrated in FIG. 3, the circumferentially adjacent teeth 2 of the yoke 3 include at least a portion of the proximal regions 25 on the opposite side of the two teeth 2. In this case, the proximal regions 25 of adjacent teeth 2 face each other. Therefore, the adjacent teeth 2 are easily secured to pass magnetic flux through the proximal region 25 of each tooth 2.

When the core 1, which includes adjacent teeth 2 having facing proximal regions 25 as described above, is utilized in a polyphase AC rotating electrical machine, coils 80 (FIGS. 6 and 7) having the same phase may be disposed on each of adjacent teeth 2, or coils 80 having different phases may be disposed on each of adjacent teeth 2. In particular, if coils 80 in phase are placed in adjacent teeth 2, the decrease in torque is more likely to be inhibited compared to the case where a different coil 80 is placed. For example, when the core 1 is used for a three-phase AC rotating electrical machine, U-phase coils (not shown) may be disposed in the first and second teeth 2 from the left of FIG. 3, V-phase coils (not shown) in the third and fourth teeth 2, and W-phase coils (not shown) in the fifth and sixth teeth 2, respectively. In this case, a proximal region 25 is disposed on the side separated from each other by the adjacent teeth 2, for example with respect to the second and third teeth 2 from the left of FIG. 3, the proximal regions 25 are disposed at a position where both teeth 2 are distant from each other.

Figure 4:
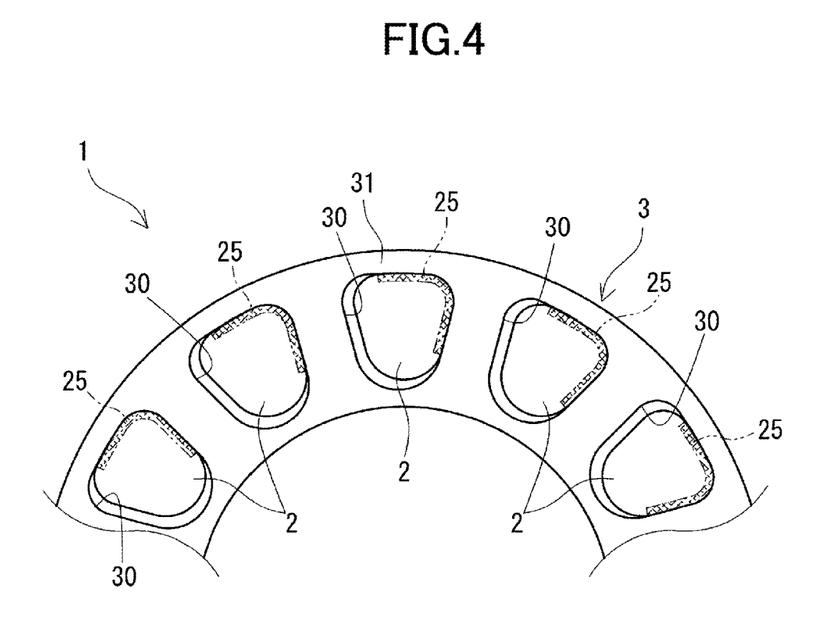
FIG. 4 is a schematic plan view showing a portion of a core of an embodiment regarding an example of a core whose teeth have proximate regions on the same side in a circumferential direction of the yoke.

Alternatively, as illustrated in FIG. 4, the teeth 2 may include at least a portion of the proximal region 25 on the same circumferential side of the yoke 3 in the teeth 2. In this case, it is easy to ensure the passage of magnetic flux through the proximal region 25 of each of the teeth 2. In addition, in this case, it is expected that the passage of magnetic flux through the proximal region 25 of each tooth 2 is likely to be uniform, the magnetic flux is not turbulent, and torque pulsation is easily reduced. Further, in this case, each tooth 2 can be secured to each through-hole 30 of the yoke 3 uniformly. This configuration also improves core 1 manufacturability in this regard. FIG. 4 illustrates an example in which a part of the proximal region 25 is provided on the right side of each tooth 2.

When the rotating electrical machine 9 is constructed using the core 1 having the proximal region 25 of each tooth 2 on the same side in the circumferential direction of the yoke 3, each tooth 2 may have the proximal region 25 on the same side as the rotational direction of the rotor 90 (FIG. 7) or on the opposite side to the rotational direction. In particular, when each of the teeth 2 has a proximal region 25 on the same side as the rotational direction, the decrease in torque is more easily inhibited than when each of the teeth 2 is provided on the opposite side.

<<Height Variation>>

Figure 5:
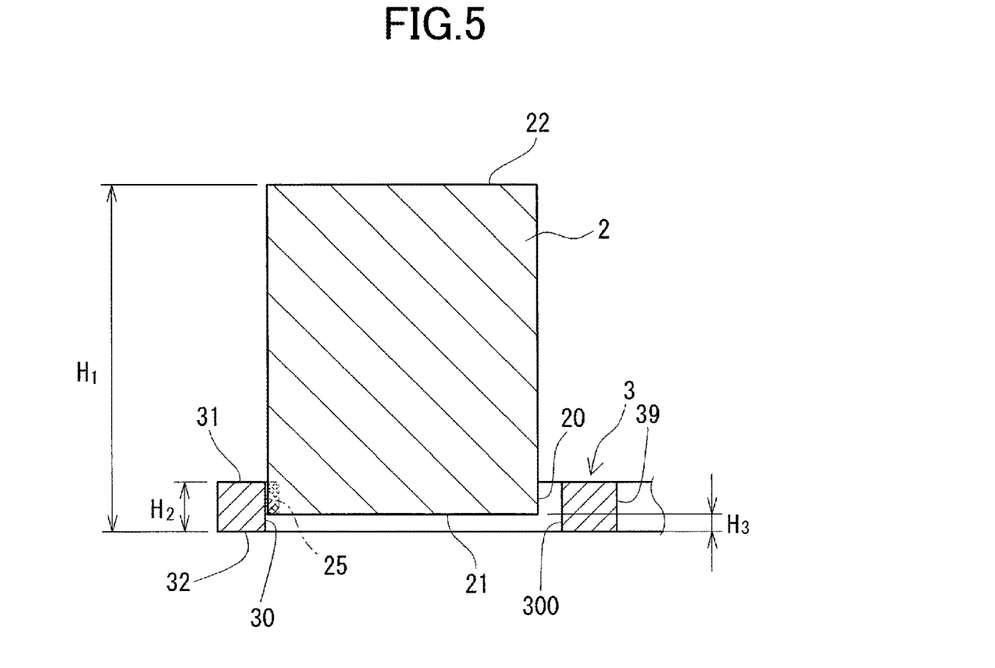
FIG. 5 is a partial cross-sectional view of a core along a (V)-(V) line of FIG. 1.
Figure 7:
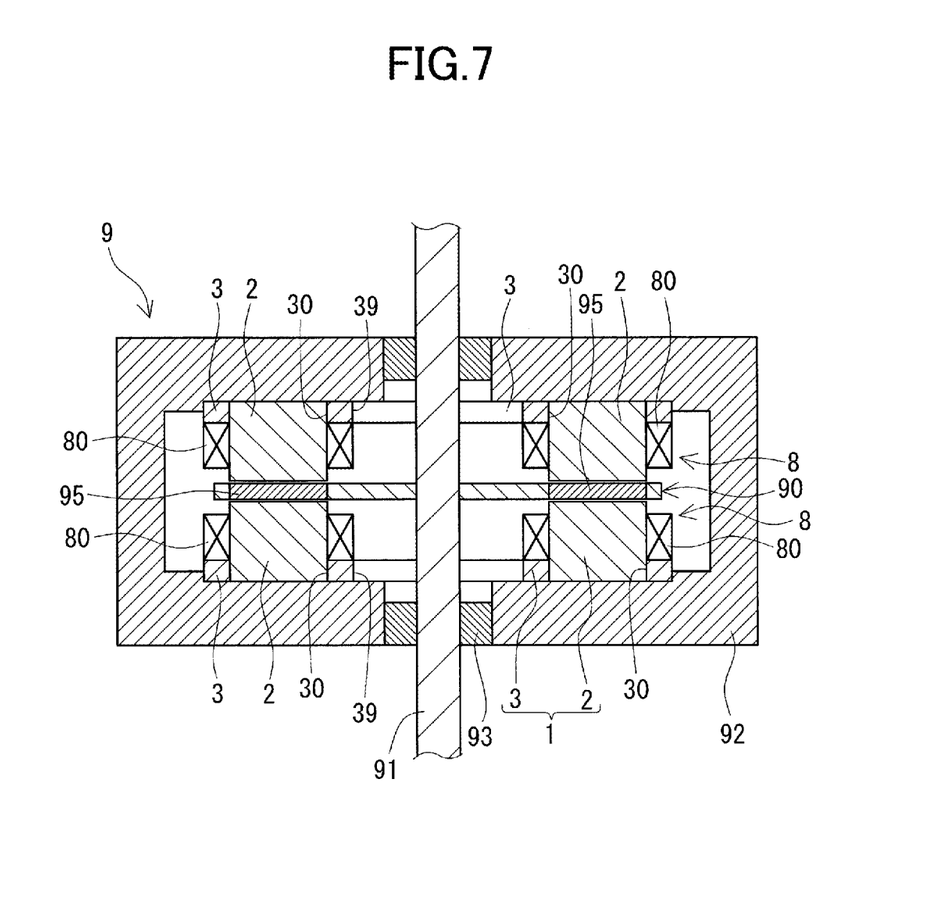
FIG. 7 is a schematic cross-sectional view illustrating an example of a rotating electrical machine according to an embodiment.

Because the yoke 3 and the teeth 2 are composed of independent members, variations may occur in the height of multiple teeth 2 relative to the yoke 3. Even in this case, the variation of the height of the plurality of teeth 2 relative to the yoke 3 is preferably not more than 0.1 mm. As illustrated in FIG. 5, the height of the teeth 2 with respect to the yoke 3 is a length H1 from the reference plane to the other end face 22 of the yoke 2, where the second face 32 of the yoke 3 is an extended plane as the reference plane. If the variation of the above-described height is 0.1 mm or less, the other end face 22 of the plurality of teeth 2 is considered to be substantially on the same plane. When the rotating electrical machine 9 is constructed using the core 1, the other end faces 22 of the teeth 2 face at substantially uniform intervals at any of the positions of the magnet 95 (FIG. 7). For this reason, the magnetic flux of the magnet 95 received by the teeth 2 is substantially uniform at any point, and the cogging torque is easily reduced.

The height of each of the teeth 2 can be easily adjusted by adjusting the amount of insertion of one end of each of the teeth 2 into each through-hole 30. For example, one end of each of the teeth 2 may be inserted into the through-hole 30 so that the length H3 from the above-described reference plane to one end face 21 of each of the teeth 2 is 10% or less of the thickness H2 of the yoke 3. In other words, the insertion amount (H2−H3) of one end of the teeth 2 relative to the through-hole 30 may be 90% or more of the thickness H2 of the yoke 3. Typically, the thickness H2 of yoke 3 is substantially uniform across the yoke 3, and the axial lengths of teeth 2 are substantially uniform across all teeth 2. Therefore, the height of each of the teeth 2 can be fixed by defining the insertion amount of one end portion of each of the teeth 2 to the through-hole 30. In the above-described form, because the region facing the outer peripheral face 20 of one end portion of each of the teeth 2 and the inner peripheral face 300 of the through-hole 30 can be sufficiently secured, the area of the magnetic flux passing between the teeth 2 and the yoke 3 can be sufficiently secured. Further, in the above-described embodiment, because the area facing the outer peripheral face 20 of one end portion of each of the teeth 2 and the inner peripheral face 300 of the through-hole 30 can be sufficiently secured, the fixation of the yoke 3 and the teeth 2 can be readily strengthened.

<Component Materials>

The component material of the core 1 includes a soft magnetic material. Typically, the core 1 is comprised primarily of a soft magnetic material. The soft magnetic materials include, for example, pure iron or iron base alloys.

Here, pure iron means that the purity is 99% or more, that is, the content of Fe (iron) is 99% or more by mass. Pure iron has the effect of high saturation magnetic flux density, enhanced formability, and easy densification by compression molding. For this reason, if the material contains pure iron, the material can form a core 1 with a high saturation magnetic flux density, a core 1 with a high relative density and a high density, and a core 1 with improved manufacturability, which is easy to form in the manufacturing process. In addition, because the material is dense, the saturated magnetic flux density is easily increased, and the core 1 has excellent mechanical properties such as strength.

Here, the iron base alloy includes an additive element and the rest is composed of Fe and unavoidable impurities. An iron base alloy includes one or more additive elements. Examples of added elements include Si (silicon), Al (aluminum), Cr (chromium), and the like. Examples of iron base alloys include iron base alloys including Si (Fe—Si base alloys), iron base alloys including Al (Fe—Al base alloys), and iron base alloys including Cr in addition to Si or Al. The electrical resistance of an iron base alloy is greater than that of pure iron. Therefore, if an iron base alloy is included, iron loss such as eddy current loss can be reduced and a low-loss core 1 can be achieved. It may be a core 1 containing both pure iron and iron base alloys.

The powder compact including the yoke 3 and the powder compact forming the teeth 2 are all assemblies of powder particles composed of soft magnetic materials. The powder compact maintains a predetermined shape by mainly engaging the powder particles with each other by plastic deformation. Typically, the powder compact can be manufactured by compression-molding a raw material powder containing a powder made of a soft magnetic material using a mold (not illustrated in the drawings).

The soft magnetic powders may include coated particles having an insulating coating on the face of powder particles made of a soft magnetic material. Inclusion of coated particles can reduce iron loss, such as eddy current loss, resulting in a low loss core 1. In particular, if the coating particles include powdered particles made of pure iron and coating particles having an insulating coating, the core 1 can have a high saturation magnetic flux density, enhanced magnetic properties, and low loss. Components of the insulating coating include, for example, phosphates, oxides such as silica and the like. Phosphate has excellent adhesion to powder particles made of iron or iron base alloys and improved deformability. Therefore, the insulating coating made of phosphates is easily deformed in accordance with the aforementioned deformation of the iron-based powder particles during molding, and is hard to be damaged. Thus, a powder compact can be made with a sound insulating coating. By using such a powder compact, a low loss core 1 can be produced.

<Relative Density>

When the relative density of the core 1 is high and dense, the core 1 preferably has improved magnetic characteristics such as saturation magnetic flux density and improved mechanical characteristics such as strength. Quantitatively, the relative density of yoke 3 and the relative density of teeth 2 are preferably both 90% or more. When the relative density is 90% or more, a core 1 having a high saturation magnetic flux density and an enhanced strength can be achieved. For example, it is possible to prevent the yoke 3 or the teeth 2 from being chipped by fixing one ends of the teeth 2 in the through-holes 30 of the yoke 3. When an improvement in the magnetic property, an improvement in the mechanical property, or the like is desired, the relative density is preferably 93% or more and 95% or more.

Here, the relative density is a percentage of the actual measured density of the powder compact with respect to the theoretical density of the powder compact forming the core 1. The theoretical density described above can be used as an equivalent value of the true density of the soft magnetic material forming the powder compact.

<Others>

The core 1 includes a radial portion (not illustrated) on the other end face 22 (FIG. 5) of the teeth 2. The slot is formed so as to protrude from the periphery of the other end face 22 of the teeth 2 toward the outer periphery and has an area larger than that of the other end face 22. If the rotating electrical machine 9 (FIG. 7) is configured using the core 1 including the neck portion of the teeth 2, the region facing the magnet 95 increases and the strand magnetic flux increases. Thus, the cogging can be reduced, and the characteristics of the rotating electrical machine 9 can be improved. In addition, it is possible to prevent the coil 80 (FIG. 6) from dropping off from the teeth 2.

The collar may be composed of a powder compact molded integrally with the teeth 2 or of a powder compact molded independently of the teeth 2. If the teeth 2 and the neck portion are composed of an independent powder compact, the connection between the teeth 2 and the neck portion may include, for example, adhesive bonding the other end face 22 (FIG. 5) of the teeth 2 and the bottom face of the neck portion. Further, the other end face 22 of the teeth 2 includes a convex portion or a concave portion, and a concave portion or a convex portion corresponding to the convex portion or the concave portion is provided with the lower face of the convex portion. Thus, the teeth 2 and the convex portion can be connected to each other by fitting the convex portion with the concave portion in addition to the adhesive. The recess includes a through hole.

<Manufacturing Method>

The powder compact constituting the yoke 3 and the powder compact constituting the teeth 2 can be manufactured by compressing the raw material powder into a predetermined shape as described above. The powder compact constituting the yoke 3 and teeth 2 can be made as well, if the forceps are constructed independently of the yoke 3 and tee 2. For compression molding, a press molding machine or the like can be used. Raw material powders may include binders and lubricants in addition to the soft magnetic powders. A lubricant may be applied to the mold.

The average particle size of the powder of the soft magnetic material used in the raw material powder may be, for example, 20 µm or more and 350 µm or less. If the average particle diameter of the powder is within the range described above, the powder is easily handled and easily compressed. The average particle size of the above-described powder may be 40 µm or more and 300 µm or less, and further 250 µm or less. Here, the average particle size of the above powder is measured using a laser diffraction, scattering type particle size and particle size distribution measuring device, and the particle size is made in which the cumulative mass is 50% of the mass of all particles.

As the pressure during compression molding increases, a core 1 that is easier to density and has a higher the relative density can be manufactured. The pressure may be, for example, 700 MPa or greater, and 980 MPa or greater.

After compression molding, heat treatments may be applied as required. For example, by removing distortion by heat treatment, a low loss core 1 can be produced.

Alternatively, for example, the binder or lubricant may be removed by heat treatment. When the raw material powder contains the coating particles described above, the heat treatment temperature is preferably less than or equal to the decomposition temperature of the insulating coating.

Main Actions and Effects of Embodiments

The core 1 of the embodiment comprises a powder compact in which the yoke 3 and the teeth 2 are separate from each other. Therefore, the core 1 can dispose the coil 80 in the teeth 2 before fixing it to the yoke 3. The stator having such a core 1 or an axial gap type rotating electrical machine has excellent manufacturability.

In particular, the core 1 of the embodiment is disposed such that one ends of the teeth 2 are biased in the through-holes 30 formed in the yoke 3 with respect to the fixation of the teeth 2 relative to the yoke 3. That is, the core 1 has a region in which the distance between the outer peripheral face 20 of one end portion of the tooth 2 and the inner peripheral face 300 of the through-hole 30 is locally small. Therefore, the core 1 can form a region having a small gap which is a magnetic gap between the teeth 2 and the yoke 3, and the magnetic flux between the teeth 2 and the yoke 3 can well passes through the small gap. Therefore, the core 1 can inhibit the decrease in torque and construct an axial gap type rotating electrical machine having a high torque.

<Stator>

Figure 6:
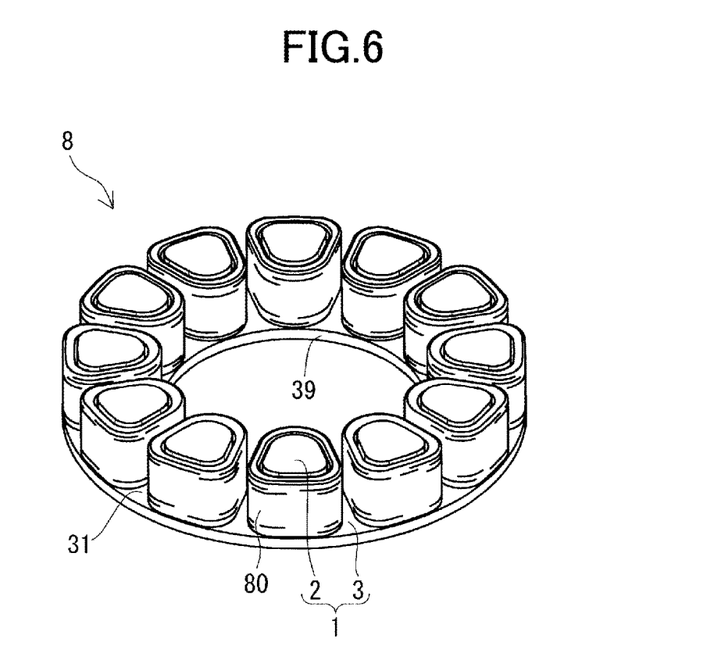
FIG. 6 is a schematic perspective view illustrating an example of a stator in an embodiment.

Referring to FIG. 6, a stator 8 of the embodiment will be described. The stator 8 includes a core 1 and a coil 80 disposed in each of the teeth 2 provided in the core 1. This stator 8 is used for an axial gap type rotating electrical machine (for example, rotating electrical machine 9 (FIG. 7)). FIG. 6 illustrates a case where the core 1 illustrated in FIG. 1 is provided.

Each coil 80 includes a cylindrical portion in which the windings are spirally wound. The coil 80 of this example is a square cylindrical edge-wise wound coil in which the windings are squared. In FIG. 6, only a cylindrical portion is illustrated, and both ends of the winding are not illustrated.

The stator 8 in the embodiment includes a core 1 of the embodiment including the yoke 3 and the teeth 2 that are separate from each other. Therefore, the coils 80 are made separately, and by fitting the coils 80 to the outside of the teeth 2 before fixing to the yoke 3, the coil 80 can be easily disposed on each of the teeth 2. The stator 8 can be manufactured by inserting the coils 80 into the teeth 2 and fixing one end of each tooth 2 to the yoke 3. The stator 8 having the core 1 as a component can independently have the winding process of the wire and the positioning process of the coil 80 to the teeth 2 during the manufacturing process. Therefore, it is not necessary to wind the wire directly in each tooth 2. Accordingly, the wires are easily wound, and the coil 80 is excellent in manufacturability. In addition, if the outer part of the teeth 2 is not formed integrally, the teeth 2 may be fixed to the yoke 3, and the coil 80 may be fitted to the outer part of the teeth 2 fixed to the yoke 3.

Because the state 8 of the embodiment includes the core 1 of the embodiment, the decrease in torque can be inhibited, and an axial gap type rotating electrical machine having a high torque can be constructed.

<Rotating Electrical Machine>

Referring to FIG. 7, a rotating electrical machine 9 according to an embodiment will be described. FIG. 7 is a cross-sectional view of a rotating electrical machine 9 cut in a plane parallel to a rotating shaft 91.

The rotating electrical machine 9 of the embodiment includes a stator 8 of the embodiment. Specifically, the rotating electrical machine 9 includes a rotor 90 and a stator 8, and is of an axial gap type in which the rotor 90 and the stator 8 are disposed to axially face each other. Such a rotating electrical machine 9 can be used for a motor or generator. FIG. 7 illustrates a single rotor and double stator type, in which one rotor 90 is assembled between two stators 8. Other examples include a configuration that includes one rotor 90 and one stator 8, and a configuration that is assembled such that one stator 8 is sandwiched between two rotors 90.

The stator 8 and the rotor 90 are housed in a case 92 having a cylindrical interior space. The case 92 includes a cylinder and two plate portions. The cylindrical portion surrounds the outer periphery of stator 8 and rotor 90. Plates are arranged on each side of the cylinder. The stator 8 and rotor 90 are housed in a case 92 so as to be sandwiched between two plate portions. The stator 8 is secured to the case 92 by fitting the outer peripheral face of the yoke 3 of the core 1 into the plate portion of the case 92. Both plates have a through-hole at their center. A through hole includes a bearing 93 through which a rotating shaft 91 is inserted. A bearing (not illustrated) is also provided in the axial hole 39 of the yoke 3 through which the rotating shaft 91 is inserted. A rotating shaft 91 passes through the case 92.

The rotor 90 is a flat member including a plurality of magnets 95 and a rotor body supporting the magnets 95. Each magnet 95 is a flat plate having a plane shape corresponding to the planar shape of the other end face 22 (FIG. 5) of the tooth 2, for example. The rotor body is an annular member that is rotatably supported by the rotating shaft 91. Each magnet 95 is equally spaced in the circumferential direction of the rotor body. Each magnet 95 is magnetized in the axial direction of the rotating shaft 91. The magnetization directions of the magnets 95 adjacent to the circumferential direction of the rotor body are opposite to each other. As the rotor body rotates, the magnet 95 also rotates with the rotor body.

The stator 8 is arranged so that the other end face 22 (FIG. 5) of the tooth 2 faces the magnet 95 of the rotor 90. The coil 80 of the stator 2 is energized to generate a rotating magnetic field, and the rotor 90 rotates relative to the stator 8 due to an attractive or repulsive force caused by the rotating magnetic field. As the rotor 90 rotates, the other end face 22 of the teeth 2 (FIG. 5) receives a magnetic flux from the rotating magnet 95.

The rotating electrical machine 9 of the embodiment includes a stator 8 of the embodiment. As described above, because the stator 8 is easy to assemble, the rotating electrical machine 9 has preferable manufacturability. Because the rotating electrical machine 9 according to the embodiment includes the stator 8 according to the embodiment, the decrease of the torque can be inhibited, and the rotating electrical machine 9 has a high torque.

Example

The torque when a core including an annular yoke and a plurality of teeth was used as a stator in a three-phase axial gap motor, was examined by simulation.

The following studies were analyzed using electromagnetic field analysis software (JSOL, "JMAG"). All core models used in the simulation are of pure iron composition and powder compacts with a relative density of 90% or more.

Both the outer shape of the teeth and the hole shape of the through hole formed in the yoke are similar trapezoidal shapes. In the teeth, the trapezoidal longitudinal portion is disposed on the outer periphery of the yoke. The size of each core shall be substantially the same. In each of the following tests, the torque was examined under the same condition of energizing the coil disposed on the teeth and the condition of rotating the magnet disposed on the other end of the teeth, except that the relationship between one end of the tooth and the through-hole was different.

Test Example 1

In this study, a core model with yokes and teeth was examined for torque effects with or without separation of yokes and teeth.

(Description of Samples)

The core of sample No. 100 is an ideal shape in which yoke and teeth are molded together. The core of the sample No. 100 is not a plurality of pieces, but a single piece, and there is no gap between the yoke and the teeth that could be a magnetic gap.

The core of Sample No. 101 is the core with yoke and teeth split against the ideal core of Sample No. 100. A through hole is formed in the yoke and one end of the teeth is disposed within the through hole. The core of sample No. 101 has a distance that may be a magnetic gap between the outer peripheral face of one end of the teeth and the inner peripheral face of the yoke through hole. The distance shall be uniformly spaced in the circumferential direction of the through-hole, and the distance shall be 0.1 mm.

The core of Sample No. 1 is the core where yoke and teeth are split relative to the ideal core of Sample No. 100. A through hole is formed in the yoke and one end of the tooth is positioned unevenly within the through hole. The core of sample No. 1 has a gap that may be a magnetic gap between the outer peripheral face of one end of the tooth and the inner peripheral face of the through-hole of the yoke. The gap has a locally small circumferential spacing of the through hole. The average of the values measured at 10 points in the circumferential direction of the through-hole for the distance between the outer circumferential face of one end of the teeth and the inner peripheral face of the through-hole is 0.1 mm. In addition, the small local spacing is 0 mm. This locally small spacing region (proximity region) provides for an L-shaped configuration across the periphery of the yoke in the teeth and opposite sides of the adjacent teeth. Coils of the same phase are placed in adjacent teeth. The percentage of the length along the circumferential direction of the through-hole in the region adjacent to the circumferential length of the through-hole (bonding percentage) is 22%. The core of Sample No. 1 is 0% of the thickness of the yoke when viewed from the extended plane of the yoke opposite the protruding face of the yoke to the end face located within the through-hole of the yoke. That is, the face of the yoke opposite the protruding side of the teeth and the end face located in the through-hole of each teeth are flush. The core of the sample No. 1 has a variation of 0 mm in the height of a plurality of teeth.

(Test Conditions)

In this test, a motor with the following stator core was hypothesized and the torque of the motor was examined.

(Conditions for Stator Cores)

Number of coils: 30 turns, cross-sectional area of the teeth: 102 mm$^2$, 14 pole 12 slots The outer diameter of the yoke is 100 mm and the inner diameter of the yoke is 70 mm Table 1 shows the torque (N·m) of each sample. The reduction rate (%) of the torque of each sample was calculated based on the torque of the sample No. 100. The torque reduction rate was determined as {(torque of each sample−torque of sample No. 100)/torque of sample No. 100)×100. The percentage reduction in torque is also shown in Table 1.

TABLE 1

| SAMPLE No. | CORE SHAPE | TORQUE (N · m) | TORQUE DECREASE PERCENTAGE (%) |
|---|---|---|---|
| 100 | NO DIVISION | 3.28 | — |
| 101 | YOKE/TEETH: INDEPENDENT YOKE HAS THROUGH-HOLES NO UNEVENNESS OF TEETH | 3.06 | −7 |
| 1 | YOKE/TEETH: INDEPENDENT YOKE HAS THROUGH-HOLES TEETH IS OFF-CENTER | 3.18 | −3 |

Table 1 shows that the core of sample No. 1 has a lower torque reduction rate for sample No. 100 compared to sample No. 101 and has a higher torque. One of the reasons for this is that the core of the sample No. 1 was positioned unevenly in the through-hole, and thus a small gap between the tooth and the yoke, which is a magnetic gap, was formed. Although the torque of the core of sample No. 1 is inferior to that of the core of sample No. 100, it is considered that a rotating electrical machine having a high torque can be constructed because the torque reduction rate is kept at 5% or less. Because the core of Sample No. 1 is constructed independently of each other, a coil can be placed in the tooth before fixing it to the yoke. Therefore, it is expected that the stator with the core of sample No. 1 and the axial gap type rotating electrical machine have excellent manufacturability.

Test Example 2

In this test, the difference between the maximum value and the minimum value between the outer peripheral face of one end of the tooth and the inner peripheral face of the through-hole of the yoke (hereinafter referred to as the maximum difference in the distance) was changed for the core of sample No. 1 used in Test Example 1. The effect of torque due to the maximum difference in the distance was investigated.

One end of the teeth was disposed unevenly in the through-hole to satisfy the maximum difference in distance shown in Table 2. The minimum value of the distance is 0 mm and the maximum value of the distance is equal to the maximum difference of the distance shown in Table 2. By increasing the size of the through-hole in the yoke, the maximum value of the distance was increased. Incidentally, the ratio of the length along the circumferential direction of the through-hole in the region adjacent to the circumferential length of the through-hole (bonding percentage) is 25%.

Table 2 shows the torque (N·m) of each sample. Similarly to Test Example 1, the percentage reduction in the torque of each sample is calculated based on the torque of the sample No. 100, and the results are shown in Table 2.

TABLE 2

| SAMPLE No. | MAXIMUM DIFFERENCE OF CLEARANCE MAXIMUM VALUE − MINIMUM VALUE (mm) | PROXIMAL REGION BONDING PERCENTAGE (%) | TORQUE (N · m) | TORQUE DECREASE PERCENTAGE (%) |
|---|---|---|---|---|
| 2 | 0.38 | 25 | 3.11 | −5 |
| 3 | 0.30 | 25 | 3.14 | −4 |

Table 3 indicates that both the sample No. 2 and sample No. 3 cores have a small reduction in torque relative to the core of sample No. 100 and have a high torque. In particular, it can be seen that the core of sample No. 3 with a maximum difference of 0.30 mm in distance has a torque reduction rate of 4% or less and has a higher torque. One of the reasons for this is that the core of sample No. 3 was difficult to form a magnetic gap between the outer peripheral face of one end of the tooth and the inner peripheral face of the through hole of the yoke. This study showed that a maximum difference in distance of less than 0.40 mm, preferably less than 0.30 mm, can effectively inhibit the decrease in torque and can easily have a high torque.

Test Example 3

In this test, the percentage of the length along the circumferential direction of the through-hole in the region close to the circumferential length of the through-hole (bonding percentage) was changed relative to the core of the sample No. 3 used in Test Example 2. The effect of torque due to the above differences in bonding percentage was investigated.

The core of sample No. 4 used in this test had a maximum difference of 0.30 mm. The core of the sample No. 4 has a proximal region on the outer periphery of the yoke at the teeth, and the aforementioned bonding percentage of the proximal region is 20%.

Table 3 shows the torque (N·m) of the core of Sample No. 4. Similarly to Test Example 1, the torque reduction rate (%) of Sample No. 4 is calculated based on the torque of Sample No. 100, and the results are shown in Table 3.

TABLE 3

| SAMPLE No. | MAXIMUM DIFFERENCE OF CLEARANCE MAXIMUM VALUE − MINIMUM VALUE (mm) | PROXIMAL REGION BONDING PERCENTAGE (%) | TORQUE (N · m) | TORQUE DECREASE PERCENTAGE (%) |
|---|---|---|---|---|
| 4 | 0.30 | 20 | 3.10 | −5 |

Table 3 indicates that the core of sample No. 4 has a small reduction in torque relative to the core of sample No. 100 and has a high torque. Compared with the core of sample No. 3 with the same maximum difference in distance, it can be seen that the higher the bonding percentage, the higher the torque. One of the reasons for this is that the proximal region of the tooth is long, which allows better passage of magnetic flux between the tooth and the yoke through the proximal region of the tooth. This study showed that when a bonding percentage is 20% or more, preferably 25% or more if the proximal region is provided, the decrease in torque can be efficiently inhibited, and the core is likely to have a high torque.

Study Example 4

In this test, as in Test Example 2, a proximal region with the above-mentioned distance of 0.05 mm or less was provided, and the location of the proximal region was changed. The effect on torque of the difference in the placement position of the above-described proximal region and the difference in the rotational direction of the rotor was investigated.

The core of each sample used in this test had a maximum difference of 0.30 mm in distance. The core of each sample has a bonding percentage of 53% in the proximal region.

The core of sample No. 5 and sample No. 6 have a proximal region on the opposite side of the teeth. That is, proximal regions of adjacent teeth are positioned oppositely. In the core of sample No. 5, different-phase coils were placed in the adjacent teeth. In the core of sample No. 6, a coil of the same phase was placed in the adjacent teeth.

The core of Sample No. 7 and Sample No. 8 provide the proximal regions of each tooth on the same circumferential side of the yoke. The core of the sample No. 7 includes a proximal region of each tooth on the same side as the rotor rotational direction. The core of the sample No. 8 provides a proximal region of each tooth opposite the rotor rotational direction.

Table 4 shows the torque (N·m) of each sample. Similar to Test Example 1, the torque reduction rate (%) for each sample is calculated based on the torque of the sample No. 100, and the results are shown in Table 4.

TABLE 4

| SAMPLE No. | PROXIMAL REGION DISPOSED POSITION | TORQUE (N · m) | TORQUE DECREASE PERCENTAGE (%) |
|---|---|---|---|
| 5 | FACING (DIFFERENT PHASE) | 3.17 | −3 |
| 6 | FACING (SAME PHASE) | 3.19 | −3 |
| 7 | ON SAME SIDE IN ROTATIONAL DIRECTION | 3.22 | −2 |

TABLE 4-continued

| SAMPLE No. | PROXIMAL REGION DISPOSED POSITION | TORQUE (N · m) | TORQUE DECREASE PERCENTAGE (%) |
|---|---|---|---|
| 8 | ON OPPOSITE SIDE IN ROTATIONAL DIRECTION | 3.19 | −3 |

Table 4 indicates that each of the cores from sample No. 5 to sample No. 8 has a relatively small reduction in torque relative to sample No. 100 and has a high torque. One reason for this may be that the proximal region of the core of the sample No. 5 to the sample No. 8 ensures the passage of magnetic flux through the proximal region. In this test, if the adjacent teeth have a proximal region on the opposite side of the teeth, placement of a coil of the same phase on each of the teeth would be more likely to inhibit the decrease in torque (see Sample No. 6). In this test, if the proximal region of each tooth is provided on the same side in the circumferential direction of the yoke and the position of the proximal region is the same side in the rotational direction of the rotor, the decrease in torque is more likely to be inhibited (see Sample No. 7).

While the present disclosure has been described with reference to an embodiment, the present disclosure is not limited to the above examples, and various modifications may be made within the scope of the claims.

DESCRIPTION OF THE REFERENCE NUMERALS 1 core
2 tooth
20 outer peripheral face
21 one end face
22 other end face
25 proximal region
26 outer peripheral region
27 inner peripheral region
3 yoke
30 through-hole
300 inner peripheral face
31 first face
32 second face
39 axial hole
8 stator
80 coil
9 rotating electrical machine
90 rotor
91 rotating shaft
92 case
93 bearing
95 magnet

The invention claimed is:

1. A core used in an axial gap type rotating electrical machine, comprising:
   an annular yoke having a plurality of through-holes disposed in a circumferential direction; and
   a plurality of columnar teeth disposed in the circumferential direction of the yoke, each of the plurality of columnar teeth including one end inserted into each of the plurality of through-holes,
   wherein the yoke and each of the teeth are composed of a powder compact separate from each other,
   wherein the one end of each of the teeth is off-center in the through-hole, and
   wherein each of the teeth includes a proximal region with a gap of 0.05 mm or less between an outer peripheral face at one end and an inner peripheral face of the through-hole.

2. The core as claimed in claim 1, wherein a percentage of a length along the circumferential direction of the through-hole in the proximity region is 20% or more with respect to a circumferential length of the through-hole.

3. The core as claimed in claim 1, wherein a difference between a maximum value and a minimum value of the distance between the outer peripheral face of the one end and the inner peripheral face of the through-hole is less than 0.40 mm.

4. The core as claimed in claim 1, wherein each of the teeth comprises at least a portion of the proximal region on an outer peripheral face side of the yoke.

5. The core as claimed in claim 1, wherein the teeth adjacent in the circumferential direction comprises at least a portion of the proximal regions on facing sides of the adjacent teeth.

6. The core as claimed in claim 5, wherein the adjacent teeth include coils with a same phase.

7. The core as claimed in claim 1, wherein the teeth comprise at least a portion of the proximal region on the same circumferential side of the yoke.

8. The core as claimed in claim 1,
   wherein each of the teeth comprises one end plane located in the through-hole and another end plane located outside the through-hole,
   wherein the yoke comprises a first face disposed on a side protruding from the teeth and a second face opposite the first face,
   wherein when a plane extended from the second face is defined as a reference plane, and when a length from the reference place to the other end face is defined as a height of the teeth, the plurality of teeth has a variation of 0.1 mm or less in height.

9. The core as claimed in claim 8, wherein a length from the reference plane to the one end plane is not more than 10% of the thickness of the yoke.

10. The core as claimed in claim 1, wherein the core component material comprises pure iron, an iron-based alloy containing Si, or an iron-based alloy containing Al.

11. The core as claimed in claim 1, wherein a relative density of the core is 90% or more.

12. A stator, comprising:
   the core as claimed in claim 1; and
   a coil disposed in each of the teeth.

13. A rotating electrical machine, comprising:
   the stator as claimed in claim 12, and
   a rotor disposed facing the stator.

* * * * *